(12) United States Patent
Gonda et al.

(10) Patent No.: US 6,366,401 B1
(45) Date of Patent: Apr. 2, 2002

(54) CLEAR CONTAINER WITH MAGNIFYING FEATURE

(75) Inventors: Frank Edward Gonda, Fairfield; Paul Kiryakos Metaxatos, Collinsville; Krista M Kuehn, Bloomfield, all of CT (US)

(73) Assignee: Unilever Home and Personal Care USA, Greenwich, CT (US)

( * ) Notice: Subject to any disclaimer, the term of this patent is extended or adjusted under 35 U.S.C. 154(b) by 0 days.

(21) Appl. No.: 09/671,133

(22) Filed: Sep. 27, 2000

Related U.S. Application Data
(60) Provisional application No. 60/168,935, filed on Dec. 3, 1999.

(51) Int. Cl.$^7$ ................................................. G02B 27/02
(52) U.S. Cl. ........................ 359/440; 359/436; 359/802
(58) Field of Search .............................. 359/440–442, 359/802–803

(56) References Cited

U.S. PATENT DOCUMENTS

| | | |
|---|---|---|
| 2,158,633 A | 5/1939 | Normandi et al. |
| 2,305,890 A | 12/1942 | Moore |
| 3,874,977 A | 4/1975 | Pyles |
| 4,044,889 A | 8/1977 | Orentreich et al. |
| 4,115,939 A | 9/1978 | Marks |
| 4,770,519 A | 9/1988 | Jacques |
| 5,193,032 A | 3/1993 | Hirth |
| 5,204,775 A | 4/1993 | McDevitt |
| 5,275,277 A | 1/1994 | Gallegos |
| 5,309,279 A | 5/1994 | Halstead |

*Primary Examiner*—James Phan
(74) *Attorney, Agent, or Firm*—Alan A. Bornstein

(57) ABSTRACT

A transparent or partially transparent container is described with a convex portion on one side wall and an image adhering to an opposite and spaced apart second side wall which appears magnified as viewed through the convex opening. The magnified image improves the aesthetics of the packaging.

6 Claims, 3 Drawing Sheets

CLEAR CONTAINER WITH MAGNIFYING FEATURE

This application claims benefit of provisional application No. 60/168,935 filed Dec. 3, 1999.

FIELD OF THE INVENTION

The invention concerns a clear container having two sides generally opposite each other where one side has a magnifying section for viewing an enlarged representation of an image adhering to the opposite side.

THE RELATED ART

It is well known to use affixed or detachable magnifying sections to read images or indicia on labels of various containers. For example, U.S. Pat. No. 5,193,032 titled "Universal Prescription Bottle Instruction Label Magnifier", issued Mar. 9, 1993 to F. Hirth; U.S. Pat. No. 5,204,775 titled "Device For Magnifying Indicia Printed on a Container", issued Apr. 20, 1993 to T. McDevitt, and U.S. Pat. No. 5,309,279 titled "Script View Of Curved Convex Magnifying Device", issued to M. Halstead on May 3, 1994 all describe detachable magnifying implements adapted to be fit on containers so as to read the label affixed thereon. Containers with magnifying sections are also known. For example, U.S. Pat. No. 4,044,889 titled "Cosmetic Container Including Integrated Lens Structure", issued to S. Orentreich, et al., on Aug. 30, 1977 describes a cosmetic outer container having a fixed magnifying section specially adapted to read small print on a second inner container which is adapted to fit inside the outer container with the magnifying section. U.S. Pat. No. 4,115,939 titled "Bottle with a Multiple Part Label", issued to C. Marks on Sep. 26, 1978, describes a clear package where front and rear label sections thereon are viewed in co-operative relationship. Aside from printing the rear most label in distorted form to compensate for the optical distortion through the refraction of the bottle and its contents, there is no description of a magnifying mode for viewing the inner surface of the rear label.

Other patents describe separate and distinct designs separated by spaced apart container walls, through which the viewer may see the inner design through e.g., a clear side wall. These patents include U.S. Pat. No. 3,874,977 titled "Decorative Glassware", issued to R. Pyles on Apr. 1, 1975; U.S. Pat. No. 2,305,890 titled "Composite Pictures", issued to J. Moore on Dec. 22, 1942; and U.S. Pat. No. 2,158,633 titled "Method Of Displaying Figures and the Like On Transparent Bodies", issued to A. Normandi et al. on May 16, 1939.

There is no suggestion or disclosure in the art of an individual container that allows a design displayed on one surface of at least a partially transparent container side wall to be viewed in magnified format from the opposite surface of the container. Accordingly, it is a feature of the present invention to provide clear containers with clear or partially clear walls with a magnifier consisting of a convex portion which forms part of one side wall whereby a design on the opposite side wall appears to be magnified when the viewer looks through the convex portion along the direction of the image on the opposite side wall. Another feature of the present invention is to provide a packaged liquid or gel product featuring opposite side walls which are at least partially transparent. One of the side walls contains a convex portion and the opposite side wall has an image directly affixed to it or contains a label with a design printed on the inner surface of the label adjacent to the side wall. The label having the image may also be transparent in which case the image may be printed on the outer surface of the label.

SUMMARY OF THE INVENTION

A container is provided which comprises a first side wall, and a second side wall; said first and second side walls being generally disposed opposite each other and spaced apart; said first side wall having a transparent convex portion and said second side wall having a transparent or translucent area opposite said convex portion. The second side wall also contains an image viewable in magnified format through the convex portion of the first side wall. This image may be etched or imprinted directly on the surface of the second side wall. Preferably the image is printed on the inner surface of an opaque label adjacent to a portion of the second side wall which is viewable from the convex portion of the first side wall. In another embodiment of the inventive container, a transparent label may be affixed to the second side wall which contains an image viewable in magnified context from the convex portion. The transparent label may comprise one or more layers and the image may be printed on either the inner label surface adjacent to the side wall, the outer label surface, an intermediate label layer in the case of a laminate label, or the like.

Preferably, the design is affixed to the second side wall by way of an adhesive label. The label may be laminated or single layer and may be composed of various film forming polymers such as polyolefin, polyethylene, polyethylene terephthalate, coated paper, and the like. Preferably a label composed of polyolefin is used. Adhesive used to adhere the label to the side wall can include acrylic based adhesives and the like. Useful adhesives cure or dry to a transparent or semi-transparent state.

A packaged product is also provided which comprises a transparent or semi-transparent composition or in other words a product which is at least semi-transparent; a container having a first and second side wall; said first and second side walls being generally disposed opposite each other and spaced apart. Said first side wall having a transparent convex portion, said second side wall having a design image printed on or adhering on its surface which is at least partially viewable through said convex portion, in magnified format. Semi-transparent as used herein is defined as having sufficient transmittance to allow enough light to pass so that an image may be seen. The walls of the container may be composed of glass or plastic. In a preferred embodiment, the first and second side walls of the container are transparent.

Preferably, a second side wall design complementary to that printed or affixed to the convex portion and viewable therein would be employed. Liquids or gels may be contained in the container of the present invention. These liquids or gels can include various food, personal care, household care products or industrial products. These products can be transparent or semi-transparent liquids and gels any may optionally contain suspended or dispersible particulates, beads, or the like. Such products include water, beverages, food products, personal cleansing products, oral hygiene products, hair care products, laundry cleaning products, hard surface cleaners, lubricants, and the like. Examples of such products include shower gels, shampoos, mouthwash, kitchen cleaning products, bathroom cleaning products, and the like.

DETAILED DESCRIPTION OF THE INVENTION

It has now been found that a container with a convex portion or bubble molded or attached onto the front side wall can serve to magnify an image or text printed on or affixed to the opposite side wall, preferably on the inside of a label attached to the opposite side wall ("back label") of the bottle. The bottle is preferably a clear bottle or contains one or more clear areas to allow sufficient light to penetrate the bottle and visualize the image on the inside of the back label. The magnified image serves to improve the aesthetics of the packaging. The bottle can be composed of glass or clear plastic such as polyethylene terephthalate, poly vinyl chloride, and the like. Polyethylene terephthalate is preferred.

Figure 1:
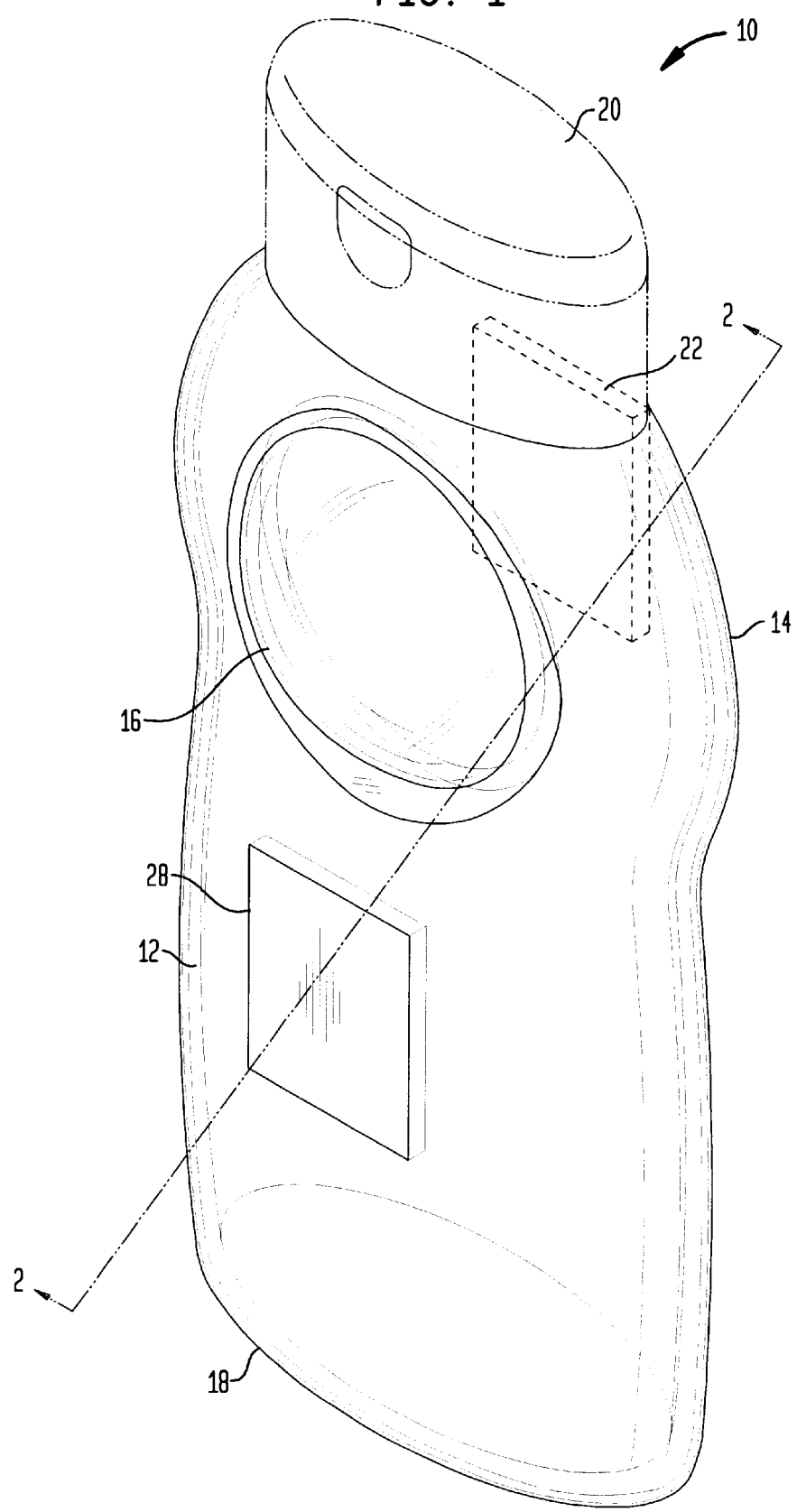
FIG. 1, is a perspective view of a clear container with magnifying feature, which is one embodiment of the present invention.
Figure 2:
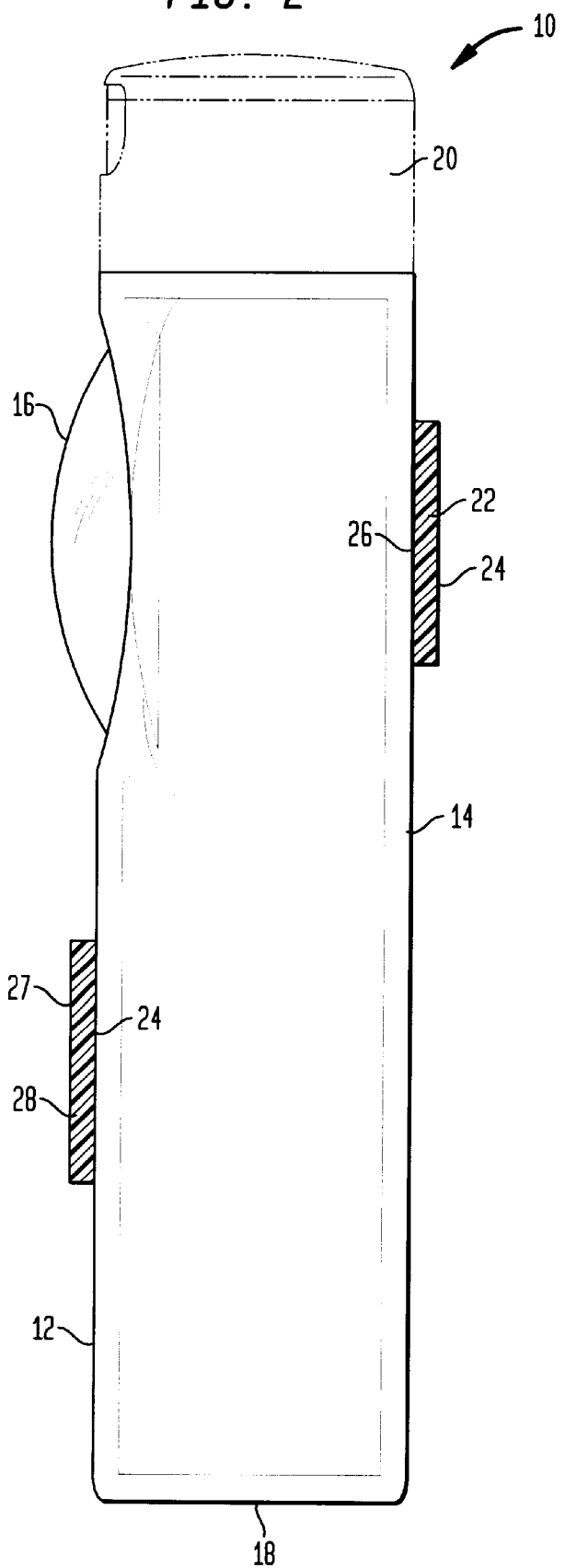
FIG. 2, is a cross-section taken along line 2—2 of FIG. 1.
Figure 3:
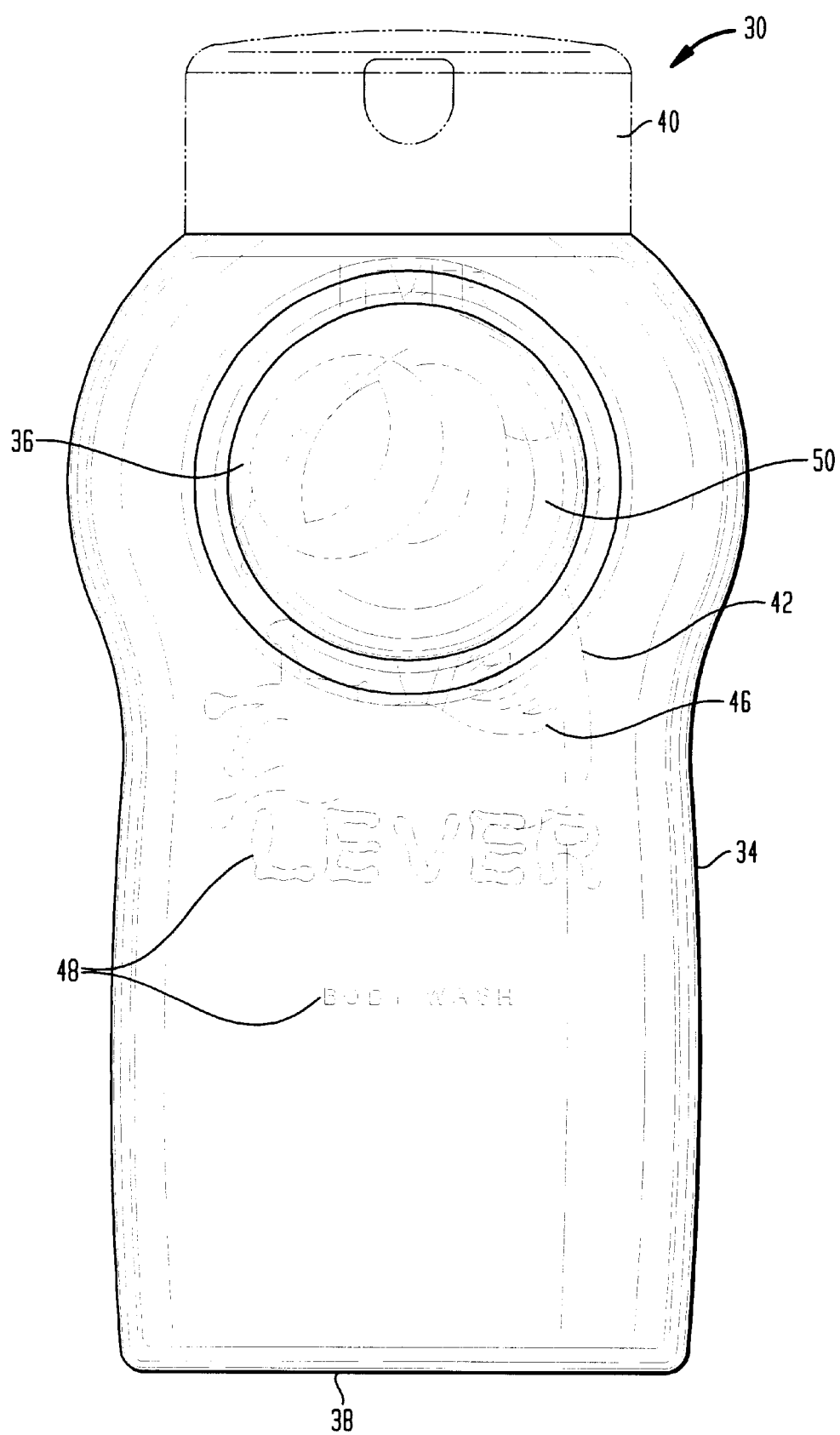
FIG. 3, is a front planar view of a second embodiment of the inventive container.

Now referring to FIG. 1, one embodiment of a clear container with magnifying feature 10, is illustrated having a front side wall 12, a rear side wall 14, a bottom 18 and a top 20. Molded or attached to front side wall 12 is convex portion 16, front label 28 is affixed to side wall 12 and rear label 22 is affixed to rear side wall 14. Now referring to FIG. 2, a cross-section of the container 10 taken along line 2—2 of FIG. 1 is illustrated having front side wall 12, rear side wall 14, bottom 18 and top 20. Convex portion 16 is molded or affixed to side wall 12, front label 28 having inner surface 25 and outer surface 27 is also affixed to side wall 12. Back label 22 having an inner surface 26 and outer surface 24, is affixed to rear side wall 14. Now referring to FIG. 3, a second embodiment of the clear container with magnifying feature 30 is illustrated. Clear container 30 has front side wall 32, bottom 38 and top 40. Convex portion 36 is molded or affixed to front side wall 32. Front label 48 is also affixed to front side wall 32. Back label 42 is affixed to rear side wall 34. In this embodiment, front side wall 32 is completely transparent and label 42 is completely visible in FIG. 3 as well as magnified portion 50 of rear label 42 having an image printed on inner surface 46.

The degree of magnification of the present invention may be affected by the level of liquid or gel in the container, depending on the refractive index differences between the container walls, the liquid or gel contents, and air. Additionally, the refractive index difference of the liquid or gel and the walls of the container may also affect the magnification, depending on the degree of overlap of the liquid or gel surface level with the convex portion 16. The viscosity of the liquid or gel may also affect the degree of magnification in the present invention, depending on flow rate and liquid or gel thickness adjacent to either or both the convex portion 16 and back label 22.

The foregoing illustrates only selected embodiments of the present invention. Numerous modifications and changes are expected to occur to those skilled in the art, all of which are within the true scope and spirit of the present invention.

What is claimed is:

1. A container comprising:

a first side wall having a transparent convex portion; and a second side wall generally disposed opposite from and spaced apart from said first side wall, said second side wall having an image viewable through said convex portion as a magnified image.

2. The container of claim 1 wherein the magnified image is printed directly on the second side wall.

3. The container of claim 1 wherein said magnified image is printed on a label affixed to said second side wall.

4. The container of claim 1 wherein said magnified image is printed on the inner surface of a label affixed to said second side wall.

5. A packaged product comprising:

A composition which is at least semi-transparent; and a container formed with a first and a second side wall, said first side wall having a transparent convex portion; and said second side wall generally disposed opposite from and spaced apart from said first side wall, said second side wall having an image viewable through said convex portion as a magnified image.

6. The product of claim 5 wherein the composition is selected from the group consisting of water, personal cleansing products, oral hygiene products, laundry cleaning products, and hard surface cleaners.

* * * * *